United States Patent
Van Puijenbroek (10) Patent No.: US 10,228,438 B2
(45) Date of Patent: Mar. 12, 2019

(54) CSS LOCALIZATION SYSTEM

(71) Applicant: TRACEWAVE GMBH, Berlin (DE)

(72) Inventor: Cornelis Adrianus Henricus Maria Van Puijenbroek, Leusden (NL)

(73) Assignee: TRACEWAVE GMBH, Berlin (DE)

( * ) Notice: Subject to any disclaimer, the term of this patent is extended or adjusted under 35 U.S.C. 154(b) by 324 days.

(21) Appl. No.: 15/037,732

(22) PCT Filed: Nov. 20, 2014

(86) PCT No.: PCT/NL2014/050796
§ 371 (c)(1),
(2) Date: May 19, 2016

(87) PCT Pub. No.: WO2015/076674
PCT Pub. Date: May 28, 2015

(65) Prior Publication Data
US 2016/0291123 A1    Oct. 6, 2016

(30) Foreign Application Priority Data

Nov. 21, 2013 (WO) ................ PCT/NL2013/050837

(51) Int. Cl.
*G01S 5/02* (2010.01)
*G01S 5/12* (2006.01)
(Continued)

(52) U.S. Cl.
CPC .......... *G01S 5/0273* (2013.01); *G01S 5/0205* (2013.01); *G01S 5/0284* (2013.01); *G01S 5/06* (2013.01);
(Continued)

(58) Field of Classification Search
CPC .... G01S 5/0273; G01S 5/0205; G01S 5/0284; G01S 5/06; G01S 5/12; H04W 64/003; H04W 64/006
(Continued)

(56) References Cited

U.S. PATENT DOCUMENTS 9,766,321 B2 * 9/2017 Schwartz .................. G01S 5/06
2008/0231498 A1  9/2008 Menzer et al.
(Continued)

FOREIGN PATENT DOCUMENTS

EP    1 815 267 A1    8/2007
WO    98/47019 A1   10/1998

OTHER PUBLICATIONS

Daegun Oh et al.: "A Subspace-Based Two-Way Ranging System Using a Chirp Spread Spectrum Modem, Robust to Frequency Offset", IEEE Transactions on Wireless Communications, vol. 11, No. 4, Apr. 1, 2012 (Apr. 1, 2012), pp. 1478-1487, XP055135980, ISSN: 1536-1276, DOI: 10.1109/TWC.2012.030512.111044 p. 1478, paragraph 3.
(Continued)

*Primary Examiner* — Harry K Liu
(74) *Attorney, Agent, or Firm* — Young & Thompson (57) ABSTRACT

Method for localizing a wireless node in a wireless sensor network, and wireless node using the method. The method includes sending a chirp spread spectrum signal with a carrier frequency from a first wireless node (A) to a second wireless node (B), the second wireless node (B) including a plurality of antennas; receiving the chirp spread spectrum signal at the plurality of antennas; executing time-of-arrival ranging between the first and second wireless nodes (A, B) for determining a distance between the first and second wireless nodes (A, B); and detecting a relative phase shift of the received chirp spread spectrum signal at each of the
(Continued)

Node B plurality of antennas of the second wireless node (B) and determining a direction of the first wireless sensor node (A) with respect to the second wireless sensor node (B) from the detected relative phase shift.

12 Claims, 4 Drawing Sheets

(51) Int. Cl.
*H04W 64/00* (2009.01)
*G01S 5/06* (2006.01)
(52) U.S. Cl.
CPC ............. *G01S 5/12* (2013.01); *H04W 64/003* (2013.01); *H04W 64/006* (2013.01)
(58) Field of Classification Search
USPC .......................................................... 342/453
See application file for complete search history.

(56) References Cited

U.S. PATENT DOCUMENTS

2012/0274516 A1* 11/2012 Lobo ........................ G01S 5/04
342/463
2015/0215793 A1* 7/2015 Siomina ................ G01S 5/0205
455/456.1

OTHER PUBLICATIONS

Klaus Solbach et al."Four-Square Phased Array for Multi-Beam Applications using Novel Matrix Feed", Proceedings of the 37th European Microwave Conference, 2007, pp. 1637-1640).
International Search Report, dated Mar. 5, 2015, from corresponding PCT application.

* cited by examiner

CSS LOCALIZATION SYSTEM

FIELD OF THE INVENTION

The present invention relates to a chirp spread spectrum (CSS) based localization system, more particularly to a CSS based localization system for a wireless node in a wireless network. Localization can refer to two main groups of measurement or detection, which can be implemented separately or in combination, i.e. ranging and direction measurement.

PRIOR ART

The European patent application EP1815267A1, "Symmetrical multipath method for determining the distance between two transceivers", discloses a symmetrical multipath method for determining the spatial distance between two transceivers (ranging).

Further known time-of-arrival methods are One-Way Ranging (OWR) and Two-Way Ranging between two nodes in a network. In One-Way ranging Node B can calculate the distance from the time that has elapsed between the moment the signal was transmitted and the moment the signal was received. A key disadvantage of this method is that it requires the reference clock at node A and node B to be synchronized. For low cost mobile applications, this is not feasible. Node A can timestamp the signal at transmission and node B at reception, but if these clocks are not synchronized, the propagation delay cannot be calculated.

Figure 2:
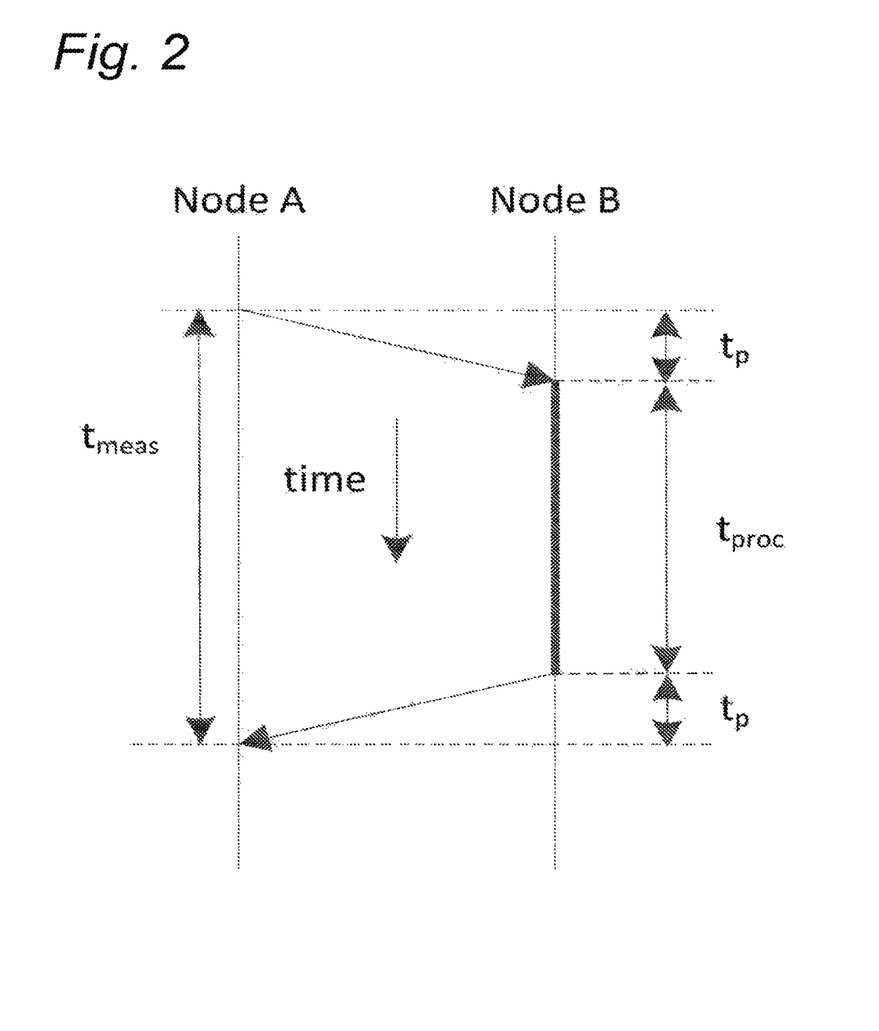
FIG. 2 shows an embodiment of frequency corrected two-way ranging according to the present invention.

Two-way ranging allows to synchronize the local reference clocks at node A and node B, as shown schematically in FIG. 2. If node B transmits a signal back to node A after a fixed processing delay $t_{proc}$, node A can measure the total time delay $t_{meas}$ and derive the propagation time $t_p$ from that, according to the formula:

$$t_p = \frac{1}{2}(t_{meas} - t_{proc})$$

As node A does the time stamping of both the first transmitted signal and the second received signal, the phase offset of the two nodes is irrelevant. There is however still a measurement error due to the frequency offset of the local reference oscillators. For low-cost equipment, quartz crystals are a commonly used frequency reference. Accuracies of 20 ppm ($20 \cdot 10^{-6}$) are achieved easily in volume production. If the reference error at node A is $e_A$ and at node B $e_B$, the measured propagation time is:

$$\hat{t}_p = \frac{1}{2}(t_{meas}(1 + e_A) - t_{proc}(1 + e_B))$$

After some calculations, the measurement error can be expressed as:

$$\hat{t}_p - t_p = \frac{1}{2}t_{proc}(e_A - e_B)$$

As an example, if the error at node A $e_A$ is +20 ppm and at node B $e_B$ is −20 ppm and if the processing time is 1 ms, the time error is 20 ns:

$$\hat{t}_p - t_p = \frac{1}{2}10^{-3}(20 \cdot 10^{-6} - (-20 \cdot 10^{-6})) = 20 \cdot 10^{-9}$$

This is equivalent to a distance measurement error of 20×0.3 m=6 m, which is unacceptable for many applications.

Symmetrical Double Sided Two-Way Ranging (SDS-TWR) is an improved scheme, where both nodes use a Two-Way Ranging method. This method compensates for the frequency errors of the reference oscillators and is e.g. used in the standard IEEE802.15.4.

$$t_p = \frac{1}{4}((t_{measA} - t_{procA}) + (t_{measB} - t_{procB}))$$

$$\hat{t}_p - t_p = \frac{1}{4}(e_A - e_B)(t_{procB} - t_{procA})$$

This method has the disadvantage that the nodes have to be active twice as long, which increases energy consumption, reduces battery time and halves air interface capacity.

Point-and-Seek method is based on walk-and-seek, except that the node-to-find-them has a directional antenna. This now adds direction to the search. The node is swept over a full circle and you move in the direction where you have measured the strongest signal. For signal-strength-based systems, the distance measurement still is very inaccurate. Because of this, one still does not know the location without walking. For time-of-flight-based systems, the distance is accurate. Main issue for such systems is the size of the directional antenna and the need to physically sweep the antenna. Also, one has to keep the antenna aimed by sweeping side to side while moving.

An alternative would be to use a beam-forming antenna This antenna does not have to be swept physically, but it is swept electronically. This is done by electronically modifying its antenna pattern. A suitable implementation is described in a paper by Klaus Solbach ("Four-Square Phased Array for Multi-Beam Applications using Novel Matrix Feed", Klaus Solbach, Stefanie Angenendt, Proceedings of the 37$^{th}$ European Microwave Conference, 2007, pp 1637-1640). The antenna is switched between four patterns. From a comparison of the four resulting signal strengths, the most likely direction can be estimated. This is a reasonable solution, especially when combined with Time-of-Flight based distance measurements. Node A now no longer has to be swept while moving. Disadvantages of this system are that the direction is still signal strength based. An interferer also may be the cause for a larger signal strength, leading to erroneous results. Furthermore, the antenna spacing cannot be chosen freely, they have to be separated by approximately a quarter wave length (for 2.4 GHz this is 32.5 mm). This limits the minimal size of a product. The antenna pattern is only defines in the plane of the antennas, i.e. it only works in 2D. The antennas have to be omni-directional, which puts severe limits on how node A is used. Any deviation from "ideal" circumstances will lead to a distorted antenna pattern and erroneous results. The unit will point in a different direction when you hold it in your hand or when you put it on the table.

The Walk-and-Seek method is an example of a direction measurement in a wireless network, for which there are two implementations: signal-strength-based and time-of-flight-based. For a signal-strength-based system, the nodes-to-be-found (B) are transmitter only. The node to find them (A) has a receiver and a read-out for signal strength. Because statistically the propagation loss increases over distance, the signal (statistically) gets stronger when you get closer to the node-to-be-found. This usually is done by walking around and trial-and-error. The distance measurement is very inaccurate. Main disadvantage is that it is very time consuming.

For a time-of-flight-based system using the walk-and-seek method, both the nodes-to-be-found (B) and the-node-to-find-them are transceivers. Node A now walks around to find a direction in which the distance decreases. The distance measurement is accurate but there is no direction. Main disadvantage is that it is very time consuming.

SUMMARY OF THE INVENTION

For an accurate distance measurement the propagation time of the radio waves need to be measured. The propagation speed of radio waves in air approach the speed of light. When the propagation time $t_p$ is known that is need to come from node A to node B, the distance d can be calculated. Every nanosecond of propagation delay is equivalent to 30 cm distance.

In free space a larger distance implies a larger propagation loss. In real life conditions, the signal is reflected by ground, walls or objects, and there are multiple propagation paths. When these signals are combined in the receiving antenna, they will have different phases and therefore very often will not add up. The effect is a large signal fluctuation. For distance measurement this is a major problem, as the same signal strength can be measured at several distances. As a consequence, distance measurements by signals strength are highly inaccurate.

The present invention seeks to provide an improved method and hardware implementation for localisation between wireless nodes in a wireless (sensor) network, e.g. a network implementing the IEEE 802.15.4 standard.

According to the present invention, a method is provided for localising a wireless node in a wireless sensor network, as well as a wireless node implementing that method. The method comprises sending a chirp spread spectrum signal with a carrier frequency from a first wireless node to a second wireless node, the second wireless node comprising a plurality of antennas; receiving the chirp spread spectrum signal at the plurality of antennas; executing time-of-arrival ranging between the first and second wireless nodes for determining a distance between the first and second wireless nodes; and detecting a relative phase shift of the received chirp spread spectrum signal at each of the plurality of antennas of the second wireless node and determining a direction of the first wireless sensor node with respect to the second wireless sensor node from the detected relative phase shift.

The method according to the invention has the technical effect that a robust and accurate CSS localisation system is obtained that uses less power and which is highly resistant to Doppler effects. Through the inventive method a host of new localization applications is now within reach as the plurality of antennas of a wireless node may be closely spaced apart inside a small form factor housing of the wireless node. The method of the present invention is therefore particularly advantageous for mobile applications that require small and mobile wireless nodes.

Further embodiments are described in the dependent claims, as well as in the detailed description of embodiments below.

SHORT DESCRIPTION OF DRAWINGS

The present invention will be explained in further detail hereinafter based on a number of exemplary embodiments with reference to the drawings, wherein.

DETAILED DESCRIPTION OF EXEMPLARY EMBODIMENTS

The present invention relates to a method for (real-time) localization of a first wireless node A with respect to a second wireless node B in a wireless sensor network, wherein localising comprises determining a distance and/or a direction of the first wireless node with respect to the second wireless node. The wireless sensor network of the present invention embodiments is based on the exchange of chirped spread spectrum signals between various wireless nodes in the wireless sensor network, such as the first and second wireless nodes. Typical embodiments of chirp spread spectrum signals of the present invention are modulated on a carrier signal having a carrier frequency, for example 2.4 GHz. For ease of reference, the phrases "chirp spread spectrum signal", "chirp spread spectrum modulated signal", "chirped modulated signal", or "chirped signal", or simply "chirp" will be considered equivalent in view of the present description.

The various nodes in the wireless network need not be stationary and may be moveably arranged, i.e. one or more wireless nodes may be mobile. Examples of wireless nodes are e.g. mobile phones, PDA's, notebooks, laptops, tablets, wireless car keys and any other device adapted for sending and/or receiving a chirp spread spectrum signal.

Figure 1:
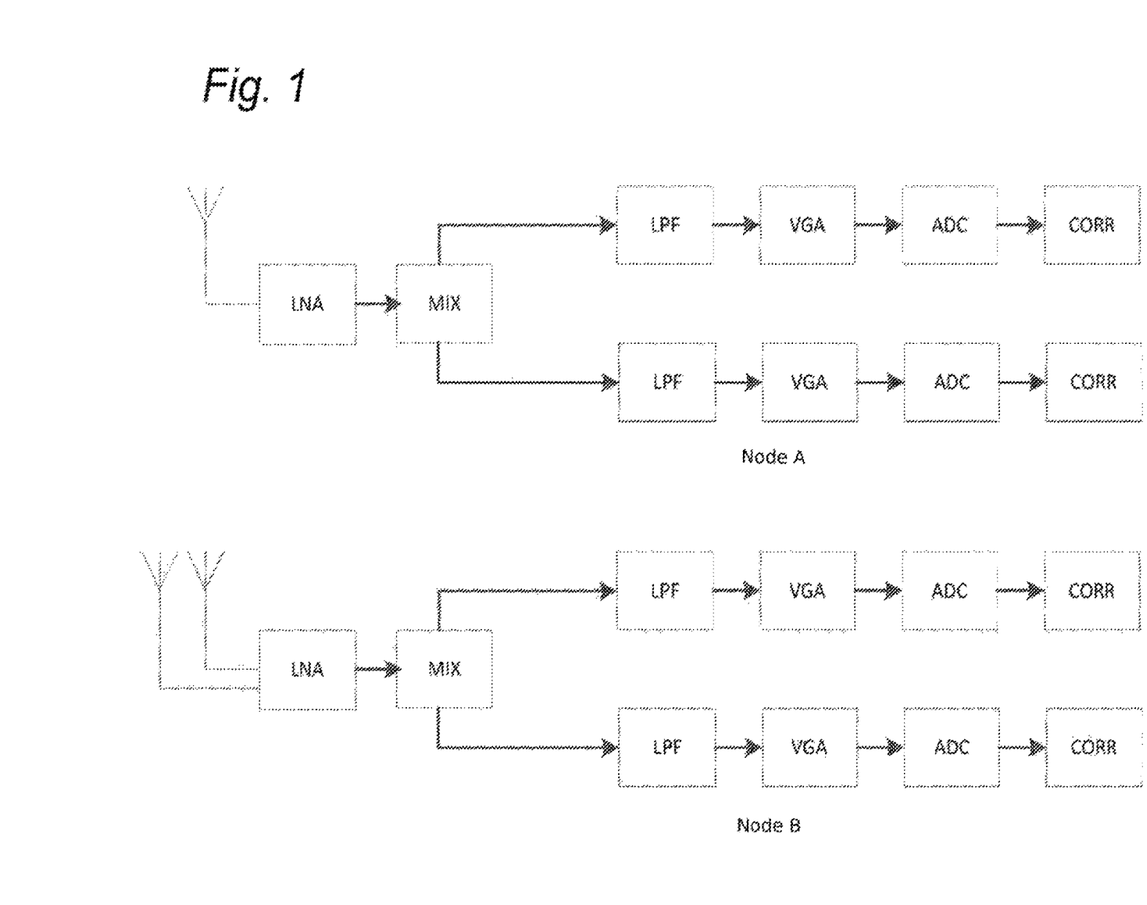
FIG. 1 shows an embodiment of a wireless sensor network according to the present invention.

According to the present invention, a method for localising a wireless node in a wireless sensor network is provided, where FIG. 1 depicts an embodiment of such a wireless sensor network having two wireless nodes A (upper part), B (lower part), which in essence may have the same internal components as shown.

In the embodiment shown, each of the nodes A, B is provided with an antenna (or antenna system having a plurality of antennas, see below), and a receiver processing unit, which, in the embodiments shown, comprises a Low Noise Amplifier (LNA), a down conversion mixer (MIX) providing a baseband complex (I/Q) signal, and for each quadrature signal component path, a Low Pass Filter (LPF), a shared Variable Gain Amplifier (VGA), Analog-to-Digital Converters (ADC), and Correlator (CORR) (see also the block diagram of FIG. 1).

The method comprises sending a chirp spread spectrum signal with a carrier frequency from a first wireless node A to a second wireless node B. In a general embodiment, the second wireless node B comprises a plurality of antennas for receiving the chirp spread spectrum signal. In a group of embodiments, the second wireless node B may comprise at least two antennas for one-dimensional (1D) localisation, or at least three antennas which are not in the same line for two-dimensional (2D) localisation, or at least four antennas which are not in the same plane for three-dimensional (3D) localisation. In yet a further embodiment, the second wireless node B may even comprise more than the minimum number of antennas for improving localization accuracy.

As the location of the first wireless node A is sought, the method further comprises receiving the chirp spread spectrum signal at the plurality of antennas of the second wireless node B. In this step the wireless node B senses a presence of the wireless node A of which a location (distance and/or direction) is to be determined with respect to said second wireless node B. To that end the method then further comprises executing time-of-arrival ranging between the first and second wireless nodes A, B for determining a distance between the first and second wireless nodes A, B. In general embodiments, the time-of-arrival ranging (TOA) may comprise One-Way Ranging (OWR), or Two-Way Ranging (TWR), or Symmetric Double Sided Two-Way Ranging (SDS-TWR). Here, the distance may be construed as the distance measured along a substantially straight line between the wireless nodes A, B.

Now that the distance between the first and second wireless nodes A, B can be determined, the method further comprises detecting a relative phase shift of the received chirp spread spectrum signal at each of the plurality of antennas of the second wireless node B and determining a direction of the first wireless sensor node A with respect to the second wireless sensor node B from the detected relative phase shift.

According to the method of the invention, the wireless node B is able to not only accurately determine the distance between the first A and second wireless node B, but the plurality of antennas of said second wireless node B also enable an accurate measurement of the direction, orientation, or angle of the first wireless node A with respect to the second wireless node B by determining the relative phase shifts between the received chirp spread spectrum signal at each of the plurality of antennas.

By virtue of the chirp spread spectrum signal, which uses the allocated bandwidth for a frequency sweep there within, detecting the relative phase shifts between the received chirped spread spectrum signal at the plurality antennas is robust to signal noise, signal disturbances and various interferences. The effect of the above CSS-based method is that a wireless node, e.g. the second wireless node B, allows for an arbitrary spatial distribution of antenna patterns and positions disposed therein. Through the inventive method a host of localization applications is now within reach as the plurality of antennas of the second wireless node B may be closely spaced apart inside a small form factor housing of said second wireless node B. Moreover, since the chirp spread spectrum signal is a low power signal and resistant to Doppler-effects, the method of the present invention is particularly advantageous for mobile applications that require small and mobile wireless nodes. For example, a small wireless car key and a corresponding car may now be adapted to execute the method of the invention to determine which car door should be unlocked based on the distance and/or direction of the wireless car key with respect to the car.

When the chirp spread spectrum signal from the first wireless node A approaches the plurality of antennas of the second wireless node B from a certain direction, it reaches some of the plurality of antennas sooner than others. Depending on a signal propagation path length, the plurality of antennas perceive relative phase differences. For example, with a carrier frequency of 2.4 GHz, a quarter wave path length difference equals to a 90° degrees phase shift, and a path length difference of about 100 picoseconds or about 1 picoseconds per degree. Such a time difference is hard to measure with electronics but a phase relationship is maintained when a frequency of a carrier signal is converted to a lower frequency.

In an embodiment, the method further comprises correlating the received chirp spread spectrum signal at each of the plurality of antennas with a reference signal at the second wireless sensor node B for detecting a relative phase shift between one or more correlation peaks. In essence, the wireless node B correlates the received chirp spread spectrum signal at each antenna with a reference signal shape. When the chirp spread spectrum signal is received at an antenna and resembles the reference signal shape, a correlation peak is detected. Detected relative phase shifts between correlation peaks at the second wireless node B is then equivalent to relative phase shifts between the received chirp spread spectrum signal by the plurality of antennas of the second wireless node B.

From a practical point of view, correlating the received chirp spread spectrum signal may be advantageously implemented using a digital correlator comprised by the second wireless node B, see e.g. correlator block CORR in FIG. 1. That is, in an embodiment the received chirp spread spectrum signal is converted from an analog signal to a digital signal (ADC), which is then fed to the digital correlator (CORR) allowing signal processing through e.g. embedded software, which when loaded onto the digital correlator, executes the correlation.

To facilitate fast and accurate correlation of the received chirp spread spectrum at the plurality of antennas, the received chirp spread spectrum is first down-converted ("mixed") to a base-band signal. This allows for a reduction of data to be correlated without losing essential information of the received chirp spread spectrum signal.

In advantageous embodiments, down conversion may be performed in the complex domain, so that the method may further comprise down conversion of the received chirp spread spectrum signal by the second wireless sensor node B at each of the plurality of antennas to a baseband complex valued signal. In a typical embodiment, down conversion comprises multiplying a real-valued chirp spread spectrum signal by a complex exponential signal, i.e. a complex exponential function, such as a complex sinusoidal signal.

To effectively perform down conversion, the second wireless node B may comprises e.g. DSP hardware and/or (embedded) software allowing for signal processing in the complex domain. This lowers hardware complexity of wireless nodes in the wireless sensor network, as DSP hardware and/or software are readily programmable, hence offering mathematical flexibility.

In an embodiment, down conversion may comprise converting the received chirp spread spectrum signal at each of the plurality of antennas to a baseband in-phase signal (I) and a baseband quadrature-phase signal (Q). In this embodiment, the received chirp spread spectrum signal is split ("mixed") into two real-valued signals as shown in FIG. 1. In this embodiment each of the two real-valued signals is correlated with a reference signal for detecting a relative phase shift between one or more correlation peaks. So each of the real-valued signals is being fed to a correlator as shown in FIG. 1.

As shown in FIG. 1, the method may further comprises, after down conversion to a baseband in-phase (I) signal and a baseband quadrature-phase signal (Q), filtering (LPF) the in-phase signal (I) and quadrature-phase signal (Q) using a low pass filter; amplifying (VGA) the in-phase signal (I) and quadrature-phase signal (Q); and converting (ADC) the in-phase signal (I) and quadrature-phase signal (Q) from an analog signal to a digital signal.

In alternative embodiments, the VGA's in the in-phase and quadrature paths are combined as a single unit allowing a precise and equal amplification of both the I- and Q-signal.

Also, the Correlator may be implemented as a complex correlator, i.e. receiving both the I- and Q-signal.

In an even further embodiment, an alternative to the direct I-Q-down conversion is used, e.g. using a superheterodyne receiver with filtering on an intermediate frequency (IF), e.g. using a Surface acoustic wave (SAW) filter.

In view of the above disclosed correlation and down conversion method steps, the second wireless node B may comprise a (direct) conversion receiver adapted to execute the correlation and down conversion.

Figure 3:
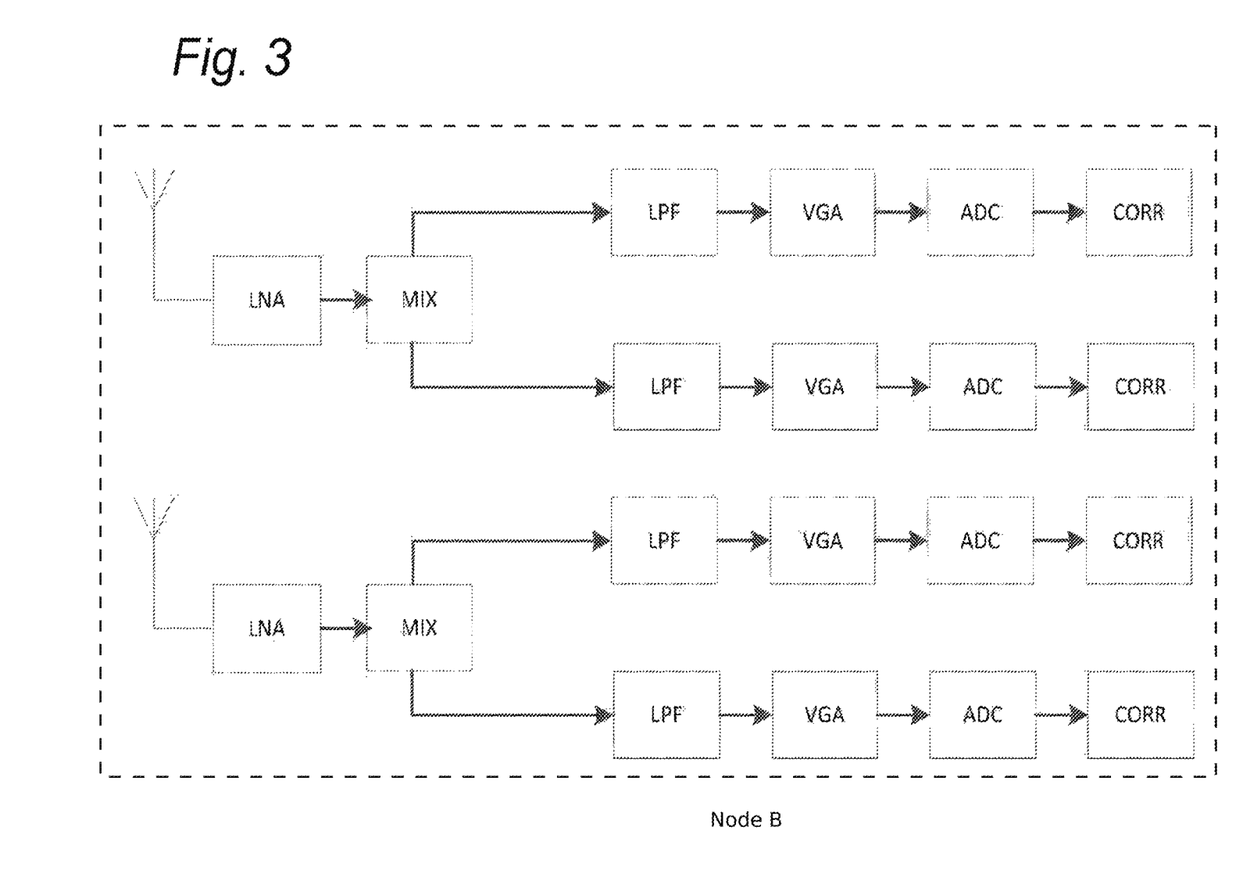
FIG. 3 shows a detail of a particular embodiment of the wireless sensor network according to the invention.

According to an embodiment of the method, each wireless node, e.g. the second wireless nodes B, may simultaneously process the received chirp spread spectrum signal at each of the plurality of antennas, in other words signal s for each of the plurality of antennas of the second wireless sensor node B are processed simultaneously. From a hardware point of view, simultaneous processing of signals at each of the plurality of antennas of a wireless node may be accomplished by providing a full receiver hardware implementation for each antenna, e.g. wherein the second wireless node B comprises a full receiver for each of the plurality antennas. The schematic diagram of FIG. 3 can be seen as an implementation of such a second wireless node B, wherein the top part processes the signals received at a first antenna, and the bottom part processes signals received at a further, second antenna. Simultaneous processing reduces signal latency, increases processing speed and the speed at which a wireless nodes can be localised.

Figure 4:
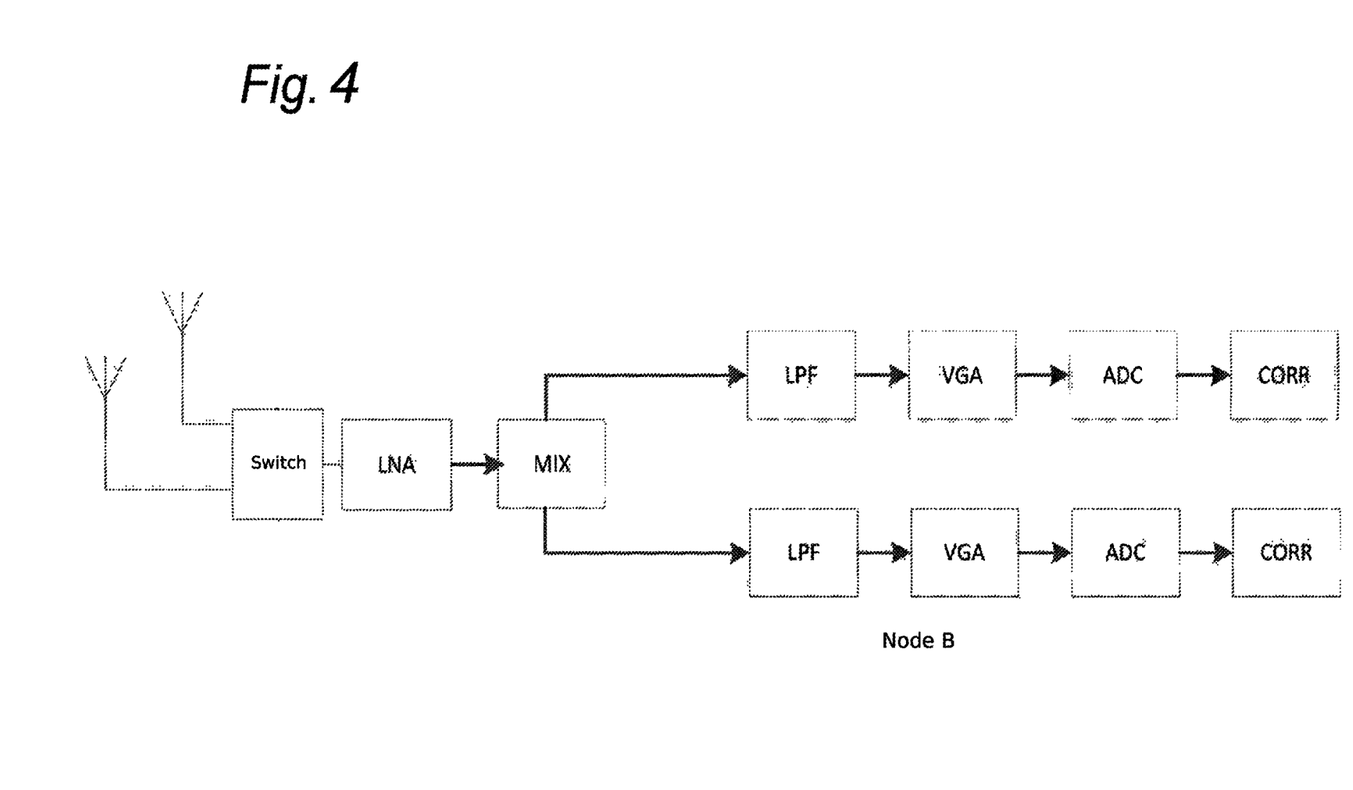
FIG. 4 shows a detail of another embodiment of the wireless sensor network according to the invention.

In certain embodiments simultaneous processing of signals at each of the plurality of antennas may not be needed and sequential processing may suffice. Then according to a further embodiment of the present invention, schematically shown in an exemplary, non-limiting arrangement in FIG. 4, detecting a relative phase shift comprises switching between each one of the plurality of antennas of the second wireless sensor node B and sequentially detecting a relative phase shift at each of the plurality of antennas. This embodiment is advantageous in case the chirp spread spectrum signal comprises a data packet having a packet preamble. Switching between each of the plurality of antennas and detecting a relative phase shift during a packet preamble is then possible without losing information in the chirp spread spectrum signal, yet with lower hardware implementation costs.

In FIG. 2 an embodiment is shown of frequency-error corrected two-way-ranging according to the present invention, wherein the first wireless node A is able to accurately determine a propagation time ($t_p$) of chirp spread spectrum signals between the first and second wireless nodes A, B without needing an accurately known processing time ($t_{proc}$) of the second wireless node B. This allows for a more accurate localisation of wireless nodes in a wireless (sensor) network.

To further clarify the above, consider a carrier signal at 2.44 GHz, wherein a carrier frequency error $e_A$ at the first wireless node A is +20 ppm, and wherein a carrier frequency error $e_B$ at the second wireless node B is −20 ppm. Then a carrier frequency error $\Delta f_B$ of the first wireless node A as perceived by the second wireless node B is $$\Delta f_B = f_{RF}(e_A - e_B)$$

In a signal from the second wireless node B to the first wireless node A, information of a perceived carrier signal frequency error ($\Delta f_B$) is added to the signal. Then from the above formula, when the first wireless node A receives the signal from the second wireless node B, the first wireless node A can determine a relative frequency error ($e_a - e_b$):

$$\Delta f_B = 2.44 \cdot 10^9 \cdot 40 \cdot 10^{-6} = 97.6 \text{ kHz}$$

In addition to the perceived carrier signal offset frequency, the second wireless node B may further determine at which fraction/ratio of a signal processing clock the signal from the first wireless node A is received. The second wireless node B can add this fraction/ratio as data content to the signal send by the second wireless node B) to the first wireless node A. From the signal send from the second wireless node B to the first wireless node A, the first wireless node A can correct a propagation time ($t_p$) without accurate knowledge of the processing time ($t_{proc}$) of the second wireless node B.

Based on the above, in an embodiment of the method of the present invention executing time-of-arrival ranging comprises two-way ranging between the first and second wireless nodes (A, B), wherein the two-way ranging comprises sending a first chirp spread spectrum ranging signal from the first wireless node A to the second wireless node B;

determining a carrier signal frequency error of the first chirp spread spectrum ranging signal as perceived by the second wireless node B;

sending a second chirp spread spectrum ranging signal from the second wireless node B to the first wireless node A, wherein the second chirp spread spectrum ranging signal comprises the determined carrier signal frequency error as data content. In advantageous embodiments, the second chirp spread spectrum ranging signal comprises an acknowledgment packet storing the carrier signal frequency error.

As mentioned above, a ratio between a signal processing clock and a signal received at the second wireless node B can be added to a signal subsequently send to the first wireless node A. Thus, the two-way ranging may further comprise determining at the second wireless sensor node B a ratio between a frequency of the received first chirp spread spectrum ranging signal and a frequency of a processing clock comprised by the second wireless sensor node B, wherein the second chirp spread spectrum ranging signal comprises the determined ratio as (further) data content.

The first wireless node A can now determine a propagation time ($t_p$) from the ratio and carrier signal frequency error comprised as data content in the second chirp spread spectrum ranging signal. To that end, the method thus further comprises determining at the first wireless node A a signal propagation time ($t_p$) from the determined carrier signal offset frequency and the ratio.

As with the carrier signal frequency error, in advantageous embodiments the second chirp spread spectrum ranging signal may comprise an acknowledgment packet storing the ratio as data content.

Note that in view of the perceived carrier signal frequency error $\Delta f_B$, the method may also comprise determining at the first wireless sensor node A a relative clock frequency error ($e_a - e_b$) from the carrier signal frequency error comprised as data content in the second chirp spread spectrum ranging signal.

According to the invention, the above frequency corrected two-way ranging (FEC-TWR) may only need two packets, a packet for the first chirp spread spectrum ranging signal and a packet for the second chirp spread spectrum ranging signal. A major advantage of FEC-TWR is lower energy consumption by wireless nodes. In case of the wireless nodes are mobile wireless nodes, battery life may therefore be significantly improved compared to e.g. conventional symmetrical double sided two-ray ranging (SDS-TWR). A second major advantage is that each node requires less air time to do the measurement. This allows for a higher density of nodes in a given area.

Furthermore, a change of relative signal frequency error over time can be determined by repeating the method of the present invention over a longer time interval. That is, in an embodiment, the method may further comprise repeating the two-way ranging over a larger time interval for measuring a change of the relative clock frequency error.

Doing so enables the first wireless node A to estimate a future frequency error by extrapolating a relative clock frequency error ($1^{st}$ order: linear, $2^{nd}$ order; quadratic etc.). This saves energy for wireless nodes having low duty cycles. For example, if the second wireless node B wakes up every 5 seconds for a ranging measurement, and the specified maximum relative clock frequency error is 20+20=40 ppm, the second wireless node B has to wake up $5 \times 40 \cdot 10^{-6} = 200$ μs in advance. An actual packet may arrive between 0 μs and 400 μs from that moment. On average, the second wireless node B will wait 200 μs. If executing two-way ranging takes 1 ms, then 20% additional time is wasted. As the first wireless node A now knows the relative frequency error, the second wireless node B can e.g. wake up 5 μs instead of 200 μs in advance, thereby saving close to 20% of energy.

It is noted that as discussed above, localization may comprise ranging and/or direction measurement. The above described FEC-TWR ranging technique can also be applied on its own, i.e. only as a ranging method by accurately determining propagation times of CSS-based ranging signals between wireless nodes A, B in a wireless sensor network.

Thus, a method is provided for determining a propagation time ($t_p$) of a chirp spread spectrum signal between two wireless nodes A, B in a wireless sensor network, the method for localising a wireless node in a wireless sensor network comprising two-way ranging between a first wireless node A and a second wireless nodes B, wherein the two-way ranging comprises sending a first chirp spread spectrum ranging signal from the first wireless node A to the second wireless node B;

determining a perceived carrier signal frequency error of the first chirp spread spectrum ranging signal by the second wireless node B; and sending a second chirp spread spectrum ranging signal from the second wireless node B to the first wireless node A, wherein the second chirp spread spectrum ranging signal comprises the determined perceived carrier signal frequency error as data content.

The technical effect of this method is that a processing time ($t_{proc}$) of a wireless nodes, e.g. the second wireless node B, need not be accurately known as the first wireless node A can determine the processing time ($t_{proc}$) of the second wireless node B using the perceived carrier signal frequency error, which was sent as data content to the first wireless node A. An additional advantage of the generic FEC-TWR method is that it can be used for executing time-of-arrival ranging for any of the embodiments of the CSS based localisation method according to the present invention as described above. This FEC-TWR method can be implemented separately, including all FEC-TWR method and system embodiments as described above, or in combination with any one of the direction measurement embodiments.

The present invention embodiments have been described above with reference to a number of exemplary embodiments as shown in the drawings. Modifications and alternative implementations of some parts or elements are possible, and are included in the scope of protection as defined in the appended claims.

The invention claimed is:

1. A method for localising a wireless node in a wireless sensor network, comprising:
   sending a chirp spread spectrum signal with a carrier frequency from a first wireless node to a second wireless node, the second wireless node comprising a plurality of antennas;
   receiving the chirp spread spectrum signal at the plurality of antennas;
   executing time-of-arrival ranging between the first and second wireless nodes for determining a distance between the first and second wireless nodes;
   detecting a relative phase shift of the received chirp spread spectrum signal at each of the plurality of antennas of the second wireless node; and
   determining a direction of the first wireless sensor node with respect to the second wireless sensor node from the detected relative phase shift,
   wherein said time-of-arrival ranging comprises two-way ranging between the first and second wireless nodes, the two-way ranging comprising
       sending a first chirp spread spectrum ranging signal from the first wireless node to the second wireless node,
       determining a perceived carrier signal frequency error of the first chirp spread spectrum ranging signal by the second wireless node using a local frequency base of the second wireless node, and
       sending a second chirp spread spectrum ranging signal from the second wireless node to the first wireless node.

2. The method of claim 1, further comprising:
   correlating the received chirp spread spectrum signal at each of the plurality of antennas with a reference signal at the second wireless node for detecting a relative phase shift between one or more correlation peaks.

3. The method of claim 1, further comprising:
   down conversion of the received chirp spread spectrum signal by the second wireless node at each of the plurality of antennas to a baseband complex valued signal.

4. The method of claim 1, wherein signals for each of the plurality of antennas of the second wireless node are processed simultaneously.

5. The method of claim 1, wherein detecting a relative phase shift comprises
   switching between each one of the plurality of antennas of the second wireless node, and
   sequentially detecting a relative phase shift at each of the plurality of antennas.

6. The method of claim 1, wherein the second chirp spread spectrum ranging signal comprises the determined perceived carrier signal frequency error as data content.

7. The method of claim 6, wherein the second chirp spread spectrum ranging signal comprises an acknowledgment packet.

8. The method of claim 1, wherein the two-way ranging further comprises:
   determining, at the second wireless node, a ratio between a frequency of the received first chirp spread spectrum ranging signal and a frequency of a processing clock comprised by the second wireless sensor node,
   wherein the second chirp spread spectrum ranging signal comprises the determined ratio as data content.

9. The method of claim 8, further comprising:
determining at the first wireless node a signal propagation time from the carrier signal frequency error and the ratio.

10. The method of claim 8, further comprising:
determining at the first wireless node a relative clock frequency error from the data content of the second chirp spread spectrum ranging signal.

11. The method of claim 10, further comprising:
repeating the two-way ranging over a larger time interval for measuring a change of the relative clock frequency error.

12. A wireless node for a wireless chirp spread spectrum network, the wireless node comprising a receiver processing unit arranged to execute the method according to claim 1.

* * * * *